(12) United States Patent
Wessel et al.

(10) Patent No.: US 11,636,875 B2
(45) Date of Patent: Apr. 25, 2023

(54) METHOD OF PROCESSING A SLIDER

(71) Applicant: Seagate Technology LLC, Fremont, CA (US)

(72) Inventors: James Gary Wessel, Savage, MN (US); Jason Gadbois, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 50 days.

(21) Appl. No.: 17/336,545

(22) Filed: Jun. 2, 2021

(65) Prior Publication Data

US 2021/0295863 A1 Sep. 23, 2021

Related U.S. Application Data

(62) Division of application No. 15/964,903, filed on Apr. 27, 2018, now Pat. No. 11,037,585.

(51) Int. Cl.
| | | |
|---|---|---|
| *G11B 5/31* | (2006.01) | |
| *B24B 37/005* | (2012.01) | |
| *G11B 5/60* | (2006.01) | |
| *G11B 5/39* | (2006.01) | |

(52) U.S. Cl.
CPC .......... *G11B 5/3169* (2013.01); *B24B 37/005* (2013.01); *G11B 5/3116* (2013.01); *G11B 5/3166* (2013.01); *G11B 5/3906* (2013.01); *G11B 5/6011* (2013.01); *Y10T 29/49032* (2015.01); *Y10T 29/49048* (2015.01)

(58) Field of Classification Search
CPC ..... G11B 5/3116; G11B 5/3163; G11B 5/105; G11B 5/3133; G11B 5/3169; G11B 5/1272; G11B 5/6082; Y10T 29/49041; Y10T 29/49021; Y10T 29/49046; Y10T 29/49048; Y10T 29/49032; B24B 37/048; B24B 37/00; B24B 37/005
USPC .............. 29/603.16, 603.07, 603.09, 603.12, 29/603.13, 603.15, 603.18, 729
See application file for complete search history.

(56) References Cited

U.S. PATENT DOCUMENTS

| | | | |
|---|---|---|---|
| 6,195,871 B1 | 3/2001 | Watanuki | |
| 6,786,803 B2 * | 9/2004 | Crawforth | ................ G11B 5/39 |
| 6,886,239 B2 | 5/2005 | Kasahara et al. | |
| 7,119,995 B2 | 10/2006 | Granstrom et al. | |
| 7,551,406 B1 | 6/2009 | Thomas et al. | |
| 7,554,767 B1 | 6/2009 | Hu et al. | |
| 7,643,250 B2 | 1/2010 | Araki et al. | |
| 8,956,200 B2 | 2/2015 | Druist et al. | |
| 8,956,201 B2 | 2/2015 | Druist et al. | |
| 9,564,150 B1 * | 2/2017 | Gider | ................ G11B 5/6094 |

* cited by examiner

*Primary Examiner* — Thiem D Phan
(74) *Attorney, Agent, or Firm* — Kagan Binder, PLLC

(57) ABSTRACT

The present invention is directed to the fabrication of head sliders for use in hard disk drives, and in particular the provision and usage of electrical bond pads on the slider surface structure to accommodate needs of the fabrication process as well as slider operation within a disk drive.

8 Claims, 11 Drawing Sheets

METHOD OF PROCESSING A SLIDER

CROSS-REFERENCE TO RELATED APPLICATIONS

This application is a divisional application of U.S. patent application Ser. No. 15/964,903, filed Apr. 27, 2018, now allowed, the entire contents of which are incorporated herein by reference in their entirety.

TECHNICAL FIELD

The present invention is directed to the fabrication of head sliders for use in hard disk drives, and in particular the provision and usage of electrical bond pads on the slider surface structure to accommodate needs of the fabrication process as well as slider operation within a disk drive.

BACKGROUND

Sliders are fabricated for utilization within data storage disk drives for positioning a magnetic head comprising read and write elements relative to one or more spinning disks. Each slider typically comprises read and write elements along with electrical contacts to facilitate electrical connection with an electronic data control system. Sliders are also provided with air bearing features that controllably affect the manner by which the slider flies on an air bearing created by a spinning disk. Specifically, the aerodynamic properties of the slider topography influence the fly height, pitch, roll, and other important features. These features range in size from nanometer size to millimeter size.

Typically, a distance between the slider, which contains the read and write elements and the air bearing features, and a spinning disk is 10 nm or less. In order to improve reading areal density, it is desirable to reduce the separation distance. One way to increase performance and to allow for smaller separation distance is to better flatten or reduce the roughness of certain of the slider element surfaces, namely the air bearing surface. Moreover, smaller and smaller sliders are designed to fly closer with more and more electronic functionality required.

The fabrication process of a slider comprises a multitude of steps involving a high level of complexity, low tolerances, and small size specifications. Typical processes steps include fine line photolithography, reactive ion etching, ion milling, and thin film deposition. The sliders typically include a substrate portion, an insulator layer and a multilayer thin film portion that comprises the operative layers and elements of the slider, such as including read and write transducers, heater elements, laser elements and others as are known and developed. The sliders are fabricated utilizing wafer build techniques as are well known.

An important process step is a plate lapping step that is used to ensure that the surface roughness of the slider air bearing surface is minimal. Plate lapping is a machining process that uses an abrasive material to wear away and flatten a surface. Materials used in the manufacturing of a slider vary depending on the desired properties. Typically, magnetic recording heads are constructed from a variety of materials; magnetic alloys, metal conductors, ceramic and polymer insulators in a complex three dimensional structure with very precise tolerances.

Sliders are fabricated from wafers that are created based upon the materials and layers specified for a desired slider construction. From such a wafer, a chunk or portion of the wafer is separated from the rest, which portion is typically dimensioned based upon a desired number of rows and number of sliders in each row. The wafer portion is sliced into the number of rows provided creating an equal number of slider bars as there are rows.

In the form of slider bars, the common air bearing surface is to be lapped for sizing the slider while increasing surface flatness and decreasing surface roughness. The air bearing surface of each slider is preferably to be lapped to comply with desired surface standards. After lapping, the individual sliders are diced from one another.

In order to monitor the progress of a lapping operation, an electrical method has been developed utilizing electrical lapping guides (ELGs) as provided within the layered structure for each slider. By many developed electrical processes, electrical resistance is typically measured across bond pad pairs that are electrically connected with the electrical lapping guides within the slider. These bond pads are known as ELG pads. The ELG pads are typically located on the slider trailing edge along with all of the other bond pads that are provided for electrical device functionality of the many devices of recently developed slider designs. Not only is there becoming greater need for more device bond pads, less area for these bond pads is available as sliders continue to shrink in size to accommodate higher density of data storage and smaller disk drives.

ELG pads are positioned to be electrically accessed on the slider trailing edge and so that as the slider air bearing surface is reduced by lapping or otherwise, a width of the ELGs is reduced. As the ELGs are reduced in width, a measure of resistivity across the ELG pads increases until a determined value is reached or until the circuit becomes open.

In current slider designs, ELG pads typically take up approximately the lower half of the trailing edge of each slider. The device bond pads are typically fully located within the upper half region of the slider trailing edge. Moreover, the ELG pads are sized for electrical connection, such as by a mechanical wire bonding process using gold wire, so that they can be temporarily electrically connected to the ELG bond pads for resistance monitoring during the lapping process and then removed from the ELG bond pads. Such mechanical wire bonding, as a general matter, requires greater bond surface area than the electrical bond pads for device functionality, which can utilize other developed solder techniques with smaller wires and/or flexible circuit terminals. After wafer and slider processing is complete, there is no further functionality of the ELG pads. The ELG pads remain on the slider trailing surface, but are inactive during operation of a disk drive.

SUMMARY

The present invention is directed to techniques and methods of fabrication of head sliders that utilize ELG bond pads after a ELG controlled lapping process is terminated for electrical connection to one or more transducer devices. The techniques and methods utilize an ELG bond pad after a lapping process is performed and the ELG bond pads are available for operational use with one or more transducer devices of a slider.

In a first aspect of the present invention, a method of processing a slider to be usable within a disk drive and having magnetic read and write transducers includes the steps of performing lapping operation an air bearing surface of at least one slider including magnetic read and write transducers with associated bonding pads along with at least one electrical lapping guide; monitoring progress of the lapping operation by measuring electrical resistance of the electronic lapping guide by probing an electrical lapping guide bond pad, ceasing the lapping operation at least partially based upon the measurement of a predetermined electrical resistance of the electrical lapping guide; and after the lapping operation is ceased, electrically connecting the electrical lapping guide bond pad to a transducer device bond pad of the slider, which electrical connection allows for electrical signals to and from a transducer device by way of the electrical lapping guide bond pad.

In another aspect of the present invention, a method of processing a slider to be usable within a disk drive and having magnetic read and write transducers includes the steps of performing lapping operation an air bearing surface of at least one slider including magnetic read and write transducers with associated bonding pads along with at least one electrical lapping guide; monitoring progress of the lapping operation by measuring electrical resistance of the electronic lapping guide by probing an electrical lapping guide bond pad; ceasing the lapping operation at least partially based upon the measurement of a predetermined electrical resistance of the electrical lapping guide; and after the lapping operation is ceased, electrically connecting the electrical lapping guide bond pad to a transducer device control conductor so that a transducer device connected with the electrical lapping guide bond pad can be controlled.

In yet another aspect of the present invention, a slider for use within a disk drive and having magnetic read and write transducers, comprises an array of transducer bond pads along a trailing edge of the slider and at least on electrical lapping guide bond pad, wherein the electrical lapping guide bond pad is electrically connected to a transducer device.

BRIEF DESCRIPTION OF THE DRAWINGS

The disclosure may be more completely understood in consideration of the following detailed description of various embodiments of the disclosure in connection with the accompanying drawing, in which.

DETAILED DESCRIPTION

The following specific embodiments of the present invention as set forth in the specification herein are for illustrative purposes only. Various deviations and modifications may be made within the spirit and scope of the invention without departing from the main theme thereof.

Figure 1:
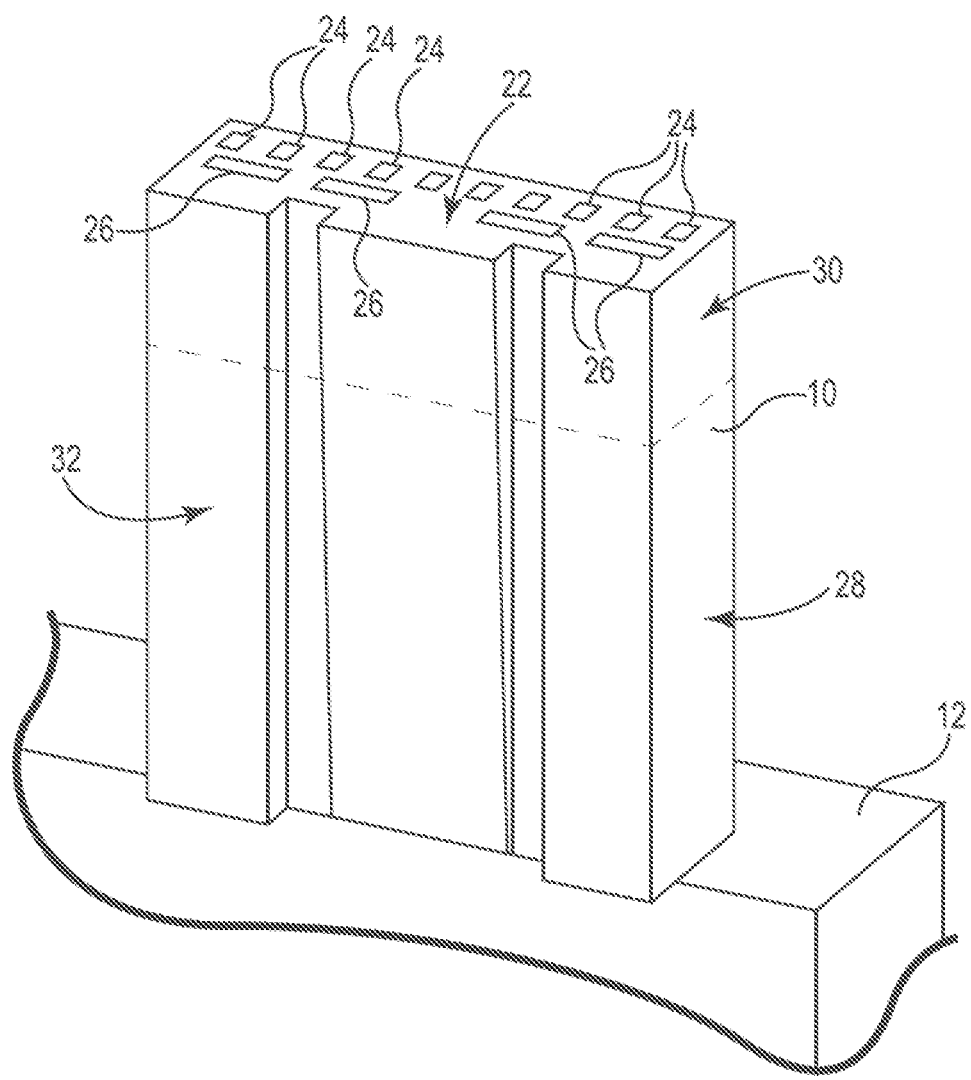
FIG. 1 is a schematic illustration in perspective of a head slider positioned relative to a supporting head suspension assembly and showing electrical bond pads arranged in rows over a surface area of the slider.

FIG. 1 illustrates a perspective view of a head slider 10 as such is operatively supported from a head suspension assembly 12. The operative connection between a slider 10 and a head suspension assembly typically includes the provision of a gimbal or flexure element (not shown) for permitting the slider to move at least in pitch and roll directions relative to a spinning disk. The gimbal or flexure can be created integrally with the head suspension assembly 12 or as a separate component and attached to the head suspension assembly. In either case, the gimbal or flexure includes a slider bond pad (not shown) to which the slider 10 is attached for controlled movement of the slider 10 as such flies over the media surface of a spinning disk.

Figure 2:
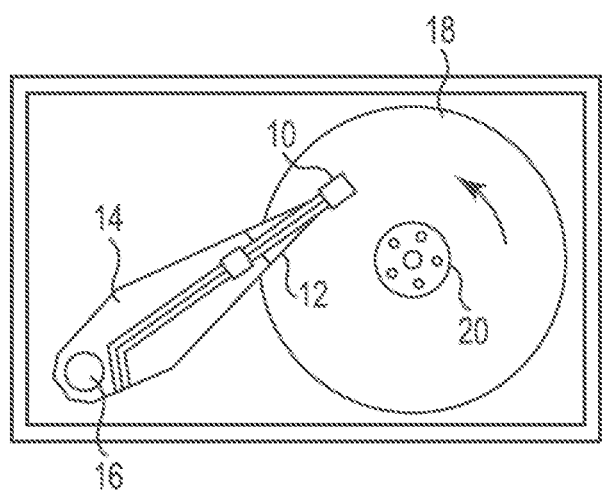
FIG. 2 is a plan view illustration of a hard disk drive including rotatable magnetic hard disk media and a head suspension assembly supporting a slider as such is movable over selective data tracks of the media.

FIG. 2 schematically illustrates a slider 10 as operatively supported by a head suspension 12, which in turn is connected to an actuator arm 14 that is movable about a hub 16. The actuator arm 14 is movable under the control of a voice coil motor or the like and as well known so that the slider 10, and in particular its read and write transducer elements (not shown) can be positioned at desired data tracks of spinning magnetic media, such as the hard disk 18 as such is rotatable about hub 20.

Referring again to FIG. 1, a trailing edge 22 of the slider 10 includes a series of first electrical contacts or bond pads 24 that are illustrated in a row over a portion of the trailing edge 22. An adjacent row of a second series of electrical contacts or bond pads 26 is also shown, which second row of bond pads 26 are illustrated relatively larger than those of the bond pads 24 of the first row. The bond pads 26 are shown larger than bond pads 24 as they are utilized as described below during fabrication of the slider 10. However, they need not be. Bond pads 24 and 26 are sized and designed for electrical connection during fabrication and slider operation. So long as the appropriate electrical connection is facilitated, the bond pad can be sized accordingly. This illustrates one of any number of orientations of bond pads 24 and 26 to one another.

According to the illustrated embodiment, the relative smaller bond pads 24 are provided for electrical connection to the many transducer devices and other devices of a developed slider design, such as including contacts for read and write transducers, read and write heaters bolometers, and/or laser elements as may be provided for operation of a head slider design known as HAMR design. Certain functional elements of such a slider require positive and negative bond pads 24 for electrical operation, while other functional elements require a single bond pad 26 and possibly connection with a shared common pad (like a ground pad) for electrical operation. These bond pads 26 are conventionally electrically connected with wires or conductor elements that are typically provided to extend along the supporting head suspension assembly for controlled operation of each of the functional elements of the head slider 10. Techniques for providing a permanent electrical connection between a conductor and a bond pad 26 include soldering jetting techniques, wire bonding, conductive adhesives, and the like.

The second set of bond pads 26 are provided for utilization during the fabrication process of the head slider 10 from a wafer or fabricated substrate, as opposed to the operative use of bonding pads 24 for slider 10 elements during operation of a disk drive. These bond pads 26 are provided to allow for temporary positive and negative electrical connection of electrical lapping guides (ELGs) during slider fabrication processes. As such, a pair of the bond pads 26 are used as ELG pads for ELG monitoring during slider processing. Multiple pairs of bond pads 26 and ELGs are preferably utilized during fabrication (two such pairs are illustrated).

A slider 10, as shown in FIG. 1, typically comprises a substrate portion 28 and a multilayer thin film laminate portion 30, which usually are separated from one another by an insulator layer. The multilayer thin film laminate portion 30 comprises the operative elements that are built within the slider 10 for functionality, as noted above, such as including read and write transducers, heater elements, photonic elements, bolometers, and the like. These elements and the like as have been or are developed for operation within a slider structure are herein referred to as transducer elements. These transducer elements can be formed as thin film structures within the multilayers of the laminate portion 30, as known. Each of these structures is electrically connected with one or more bond pads 24 and 26 to be functional, such as by conductive vias or towers that are formed through the multilayers of the laminate portion, as also known. ELG devices are formed within the multilayer laminate structure 30 and each ELG would be connected to a pair of bonding pads 26 by conductive vias or towers within the structure of the slider 10.

As described above in the Background section, a pair of bond pads 26 is electrically connected with temporary conductors by which conductors a resistance across the ELG can be measured and monitored. As shown in FIG. 1, the disk face surface of the slider 10 is known as an air bearing surface 32. This air bearing surface is fabricated during slider production, such as by ion milling or other milling operations and/or by a lapping process, so as to be aerodynamically designed. These fabrication techniques also provide the desired access of each operative transducer element that is to interact with the magnetic media of a disk at the air bearing surface near and adjacent to the trailing edge 22 of the slider 10. During a lapping or milling process, ELG material as exposed to the process is gradually removed. By monitoring the electrical resistance across an ELG, the lapping or milling process can be effectively monitored, as also well known. The removal process can be monitored and ceased upon the reading of a determined resistance or upon reaching an open circuit.

After the ELG pads 26 are utilized during the fabrication process, they are no longer necessary. There is no further function for the ELG pads 26 during slider 10 operation within a disk drive. However, as in the illustrated embodiment, the ELG pads 26 can take up about half of the available surface area of the trailing edge 22 of the slider 10. The size of the ELG pads is largely governed by the accessibility to them for temporary wire bonding and unbonding of conductors for use during the lapping or milling fabrication steps. Moreover, as also noted above in the Background section, the surface area of the trailing edge 22 that is available to provide the many needed bond pads 24 and 26 is shrinking as smaller and smaller sliders 10 are designed for greater and greater data density to the spinning media. Advanced sliders designs, such as the HAMR design, require a greater number of bond pads 24 to enable functionality of the many transducer elements of the head design.

Figure 3:
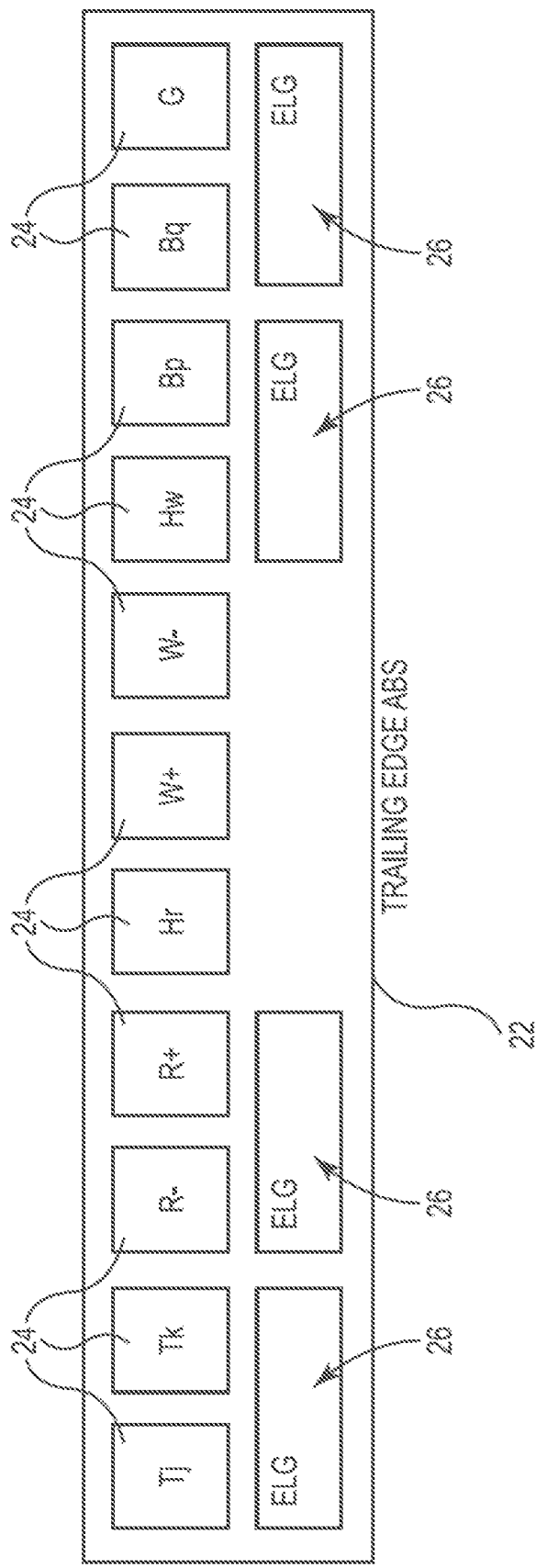
FIG. 3 is a schematic illustration of an electrical bond pad layout comprising plural rows of bond pads with a first row of transducer device bond pads provided for electrical connection of operative devices of the slider to controlling circuitry of the disk drive and a second row of ELG bond pads that for electrical connection during the fabrication process of the slider.

FIG. 3 shows the arrangement of the bond pads 24 and 26 of the trailing edge 22 of slider 10 of FIG. 1. Specifically, an eleven pad first pad 24 arrangement is shown as might be usable for a HAMR slider design. Also, two pairs of ELG bond pads 26 are shown. After the fabrication process of the slider 10, the ELG bond pads 26 have no further utility.

Figure 4:
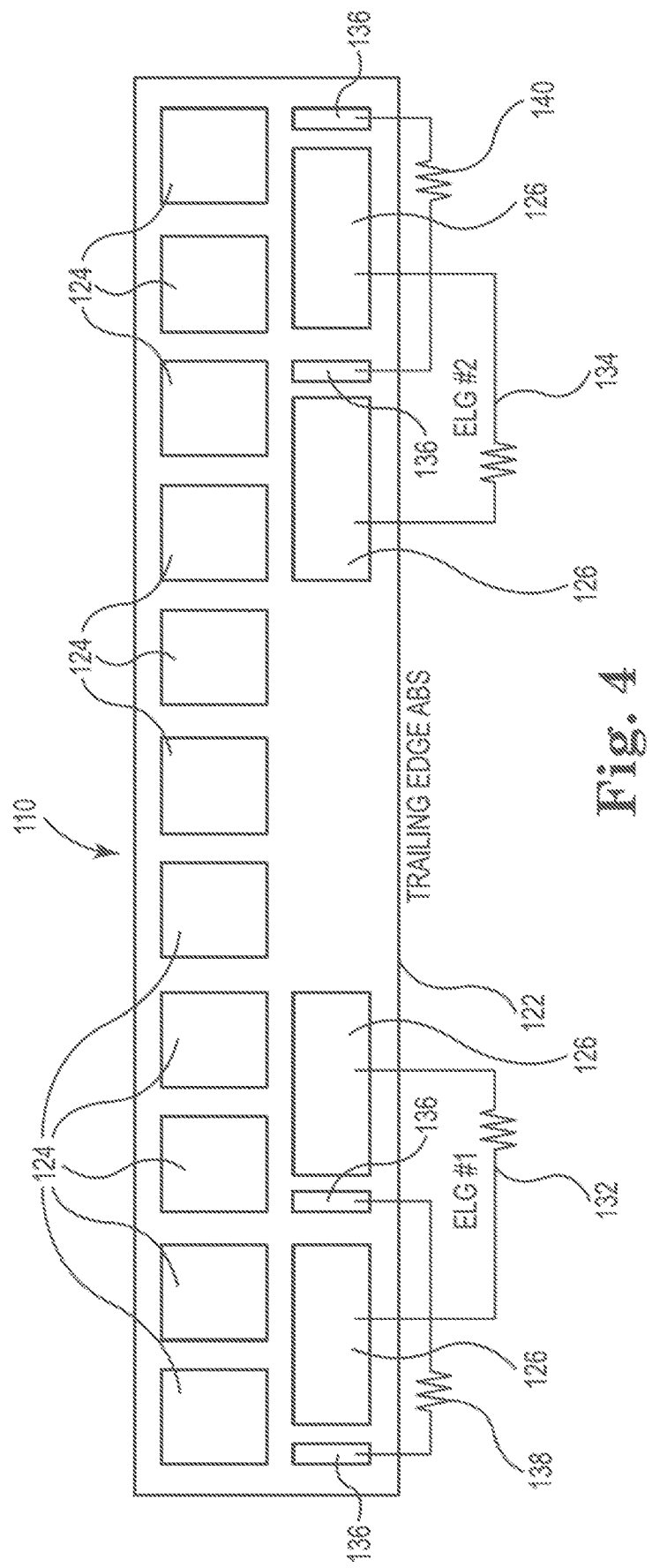
FIG. 4 is a schematic illustration of an electrical bond pad layout similar to FIG. 3, but with segmented ELG pads including a relatively small device bond pad segment closely associated with each ELG bond pad, the ELG bond pads for electrical connection to ELGs and the small device bond pad segments for electrical connection in pairs across a transducer device and in accordance with certain aspects of the present invention.

In accordance with an aspect of the present invention, another bond pad layout is illustrated in FIG. 4 for a slider 110 having a trailing surface 122. The illustrated trailing edge surface area comprises transducer device bond pads 124 as are fabricated to provide electrical connection with any number of slider functional devices, such as discussed above, including devices needing one or more connection pads 124. Also, ELG bond pads 126 are shown as two pairs similar to the ELG pads 26 of FIG. 3. A first ELG 132 is schematically electrically illustrated as connected between a pair of ELG bond pads 126 of the left side of the illustration. Similarly, a second ELG 134 is shown schematically electrically connected between a second pair of the ELG bond pads 126 on the right side of the illustration.

As compared to the ELG bond pads 26 of FIG. 3, the ELG bond pads 126 are segmented to also provide relatively smaller bond pad segments 136. In particular, the ELG bond pads 126 and the bond pad segments 136 are not electrically connected with one another as created by the slider fabrication process. The ELG bond pads 126 are preferably provided so as to be probed as normally done for resistance monitoring of the ELG devices of the slider during fabrication. The bond pad segments 136 are preferably minimized so as to allow the ELG bond pads 126 to be appropriately sized within the area utilized for ELG pads, and the bond pad segments 136 are fabricated similarly to any of the device bond pads 124 so as to be electrically connected with any transducer device or functional device of the slider 110. The bond pad segments 136 thus each comprise a transducer device bond pad in addition to the transducer device bond pads 124, and each bond pad segment and adjacent ELG bond pad create a split bond pad combination.

In accordance with a preferred embodiment of this aspect of the present invention, the bond pad segments 136 can be sized smaller than what would be required for wire bonding to conductors in the manner that can be utilized for conductor bonding to the bond pads 124. That is to say that the bond pad segments 136 can be sized smaller than what is necessary to achieve conductor bonding with known or developed bonding techniques and yet be operatively electrically connected to a functional device of the slider 110.

As also shown in FIG. 4, transducer elements 138 and 140 are schematically electrically connected between first and second pairs of the bond pad segments 136. As above, these transducer elements can be any functional device of the slider 110. Specific examples of transducer devices include a writer transducer, a bolometer, and thermal asperity detectors because these elements are differentially wired (requiring two pads each) and because these elements are less sensitive to noise or operate over smaller bandwidth.

Figure 5:
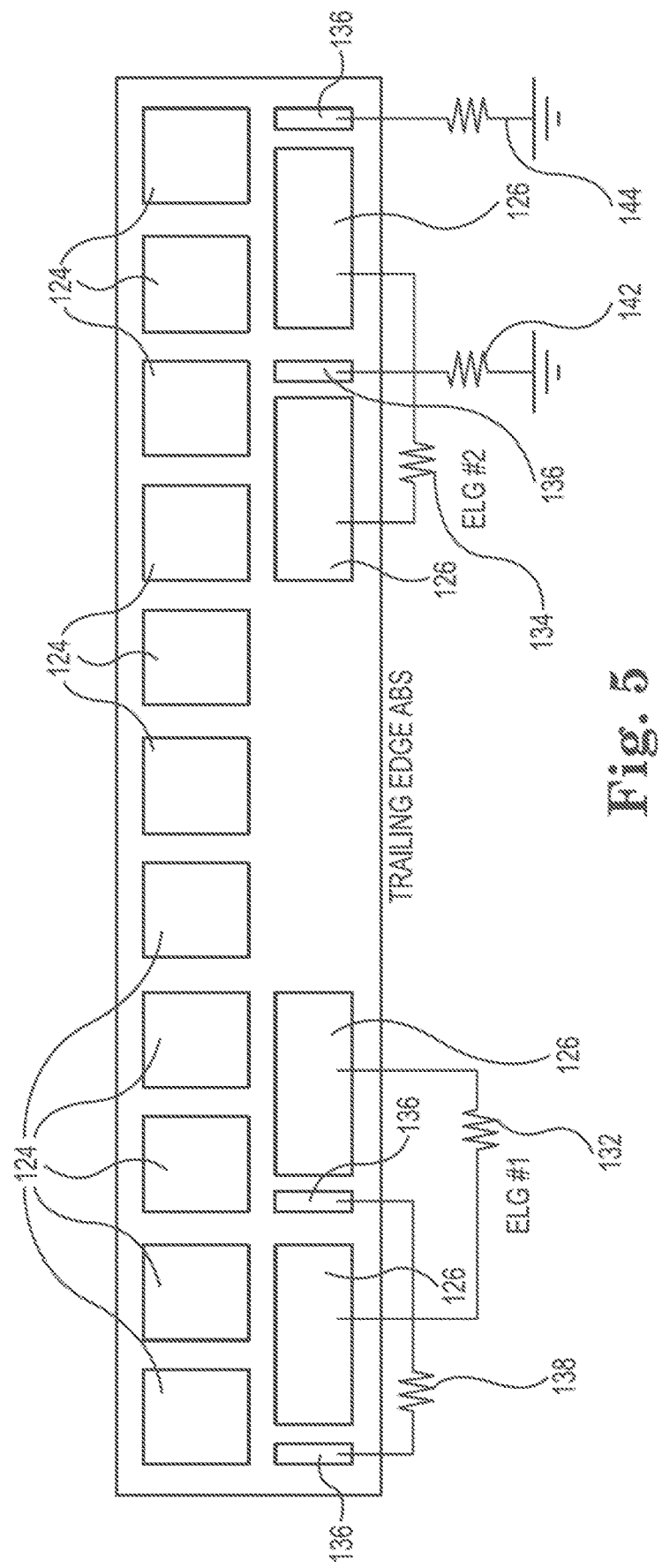
FIG. 5 is a schematic illustration of another electrical bond pad layout similar to FIG. 3 with select segmented ELG pads including a relatively small device bond pad segment closely associated with each of the ELG bond pads, the ELG bond pads are provided for electrical connection to ELGs and the small device bond pad segments are illustrated in one pair for electrical connection across a transducer device and in another pair for each to be singly electrically connected to devices that need on a single bond pad and in accordance with certain other aspects of the present invention.

In FIG. 5, a similar bond pad layout is illustrated as in FIG. 4 comprising device bond pads 124, ELG pads 126, and bond pad segments 136. The ELG pads 126 are illustrated as they can be electrically connected across ELGs 132 and 134 in the same manner. The bond pad segments 136 are illustrated (at the left side) with one pair electrically connected across a transducer device 138, as above, but a second pair of bond pad segments is schematically illustrated as separately connected across individual transducer devices 142 and 144. The devices 142 and 144 would preferably comprise transducer devices or other functional devices that are single ended, meaning that they require only one bond pad, such as heaters or the like. Such single ended devices may also be connected as well to a shared common pad. It is contemplated that any combination of differentially wired and/or single ended devices can be connected by way of ELG pad pairs after completion of the ELG process leaving the ELG pad pairs electrically unconnected to one another.

Figure 6:
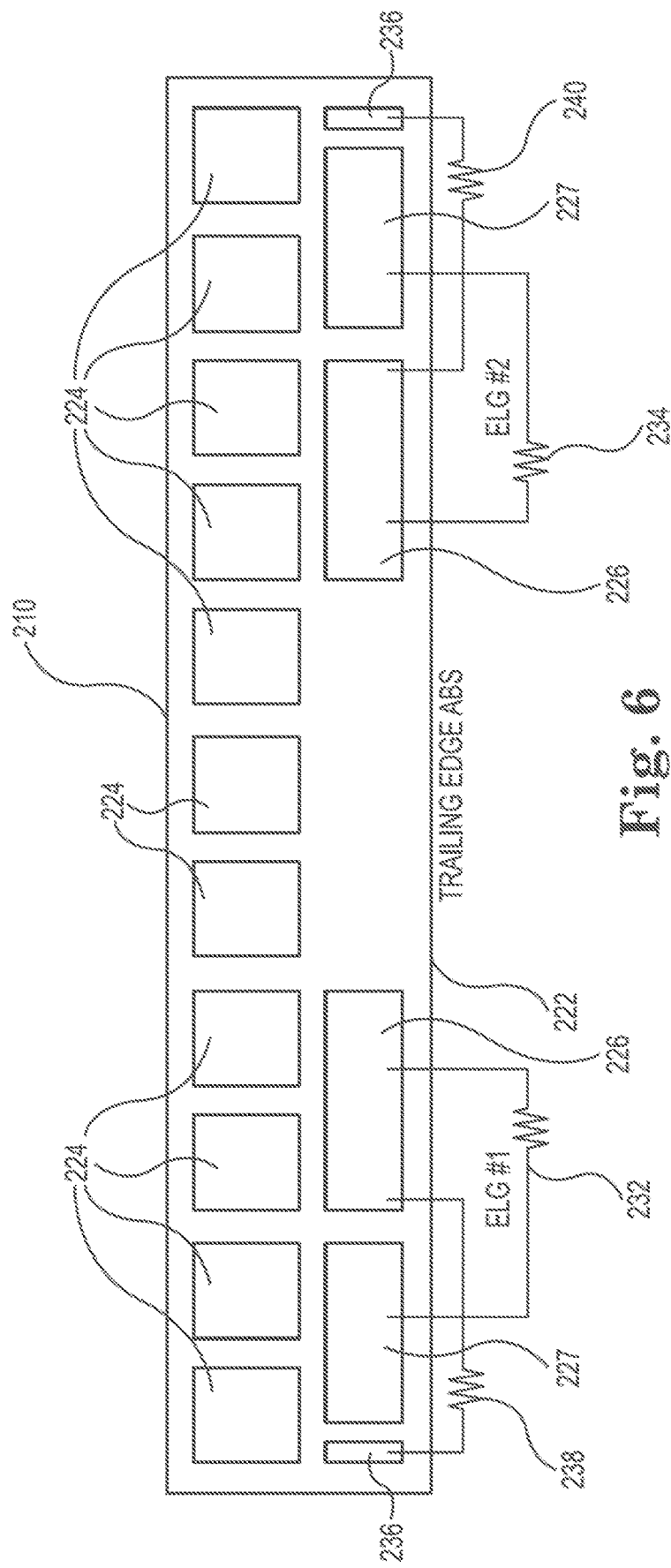
FIG. 6 is a schematic illustration of an electrical bond pad layout also similar to FIG. 3, but with segmented ELG pads including a relatively small device bond pad segment closely associated with some of the ELG bond pads, the ELG bond pads are provided for electrical connection to ELGs and the small device bond pad segments for electrical connection with ungrounded transducer devices and in accordance with certain other aspects of the present invention.

A variation of bond pad layout is illustrated in FIG. 6 as provided on a trailing edge 222 of a slider 210. The device bond pads 224 are shown similarly as those bond pads 124 of FIG. 4. According to this embodiment, only some of the ELG bond pads are segmented.

Specifically, shown are ELG pads 226 that are similar to those of FIG. 3 and other ELG pads 227 that are similar to the segmented pads 126 of FIGS. 4 and 5. The ELG pads 226 thus advantageously have a greater area for ELG wire connection than do the ELG pads 227. Both preferably have sufficient surface area for ELG wire connection. Bond pad segments 236 are preferably provided in the same manner as those 136 described above but only with those associated with the smaller other ELG pads 227.

In this case, a pair of pads comprising one ELG pad 226 and one other ELG pad 227 are connected across a first ELG 232 and a second similar pair of pads 226 and 227 are connected across a second ELG 234. These would function similarly to the ELG pads 126 of FIG. 4 during slider fabrication. A first transducer device 238 is schematically illustrated as electrically connected between a bond pad segment 236 that is associated with other ELG pad 227 and an ELG pad 226. Likewise, a second transducer device 240 is schematically illustrated as electrical connected between another bond pad segment 236 with other ELG pad 227. This arrangement is specifically suited for ungrounded transducer elements that are differentially wired. The arrangement of either transducer device 238 or 240 works because only one end of each device is connected to the ELG pads 226 and 227 during lapping. The other end of each transducer device 238 and 240 is electrically floating, so effectively the transducer device 238 and 240 isn't present during lapping and thus does not affect the resistance values monitored during lapping. The electrical circuit is only completed when the ELG pads 227 and 236 are electrically shunted or connected as described below.

The embodiments described above illustrate version of bond pad layouts in accordance with the present invention where the ELG bond pad area is at least partially shared with one or more segmented bond pads to allow one or more of the ELG pads to become functional for use in electrical connection with one or more transducer devices of a slider design. Manners of modifying these ELG and segmented pads to make them functional are described below. It is noted that aspects of the present invention are applicable to bond pad layouts of any number of different designs. The present invention allows bond pads that are specialized to slider fabrication to be functional during disk drive operation instead of having no further utility beyond the fabrication process.

Figure 7:
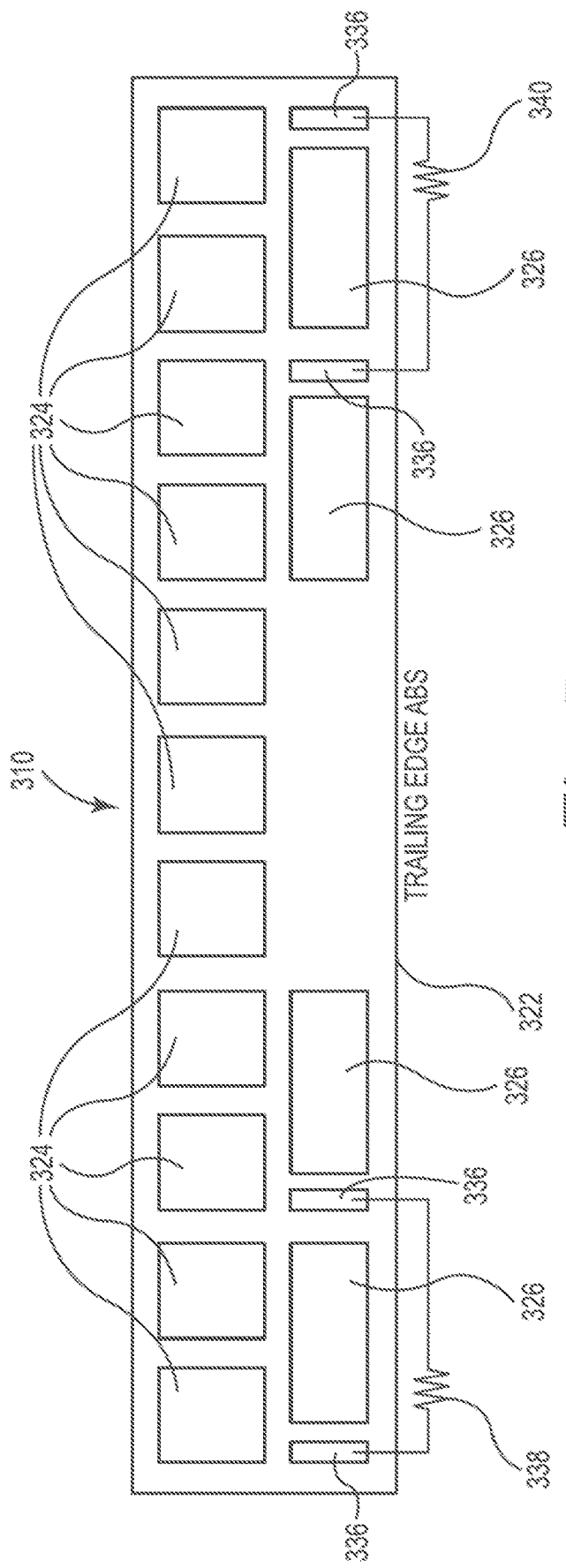
FIG. 7 is a view similar to FIG. 4 after a lapping or milling process with the ELG pads no longer electrically connected across an ELG but with a first pair of small pad segments electrically connected across a first transducer device and a second pair of small pad segments electrically connected across a second transducer device.

In FIG. 7, a bond pad layout is illustrated as provided to a trailing edge 322 of a slider 310. This bond pad layout is similar to that shown in FIG. 4. However, FIG. 7 schematically illustrates the slider 310 as such is created after the slider fabrication process has been completed, in particular. At this point, fabrication is complete and the ELG pads 326 as they exist at this time are not electrically connected to each other and have no further utility. The bond pad segments 336 are electrically connected with devices 338 and 340 as described above with regard to FIG. 4. However, the size of the bond pad segments 336 does not easily allow them to be connected with a conductor in order to make the bond pad segments 336 functional for electrical control of transducer devices 338 and 340. The ELG pads 326, although easily of sufficient size for conductor connection, are not electrically connected to any of the transducer devices. As aspect of the present invention is not only to provide functional bond pad segments 336 without taking desired space for the ELG pads 326, but also to allow them to be accessed for connection with a conductor to make the bond pad segments fully functional.

Figure 8:
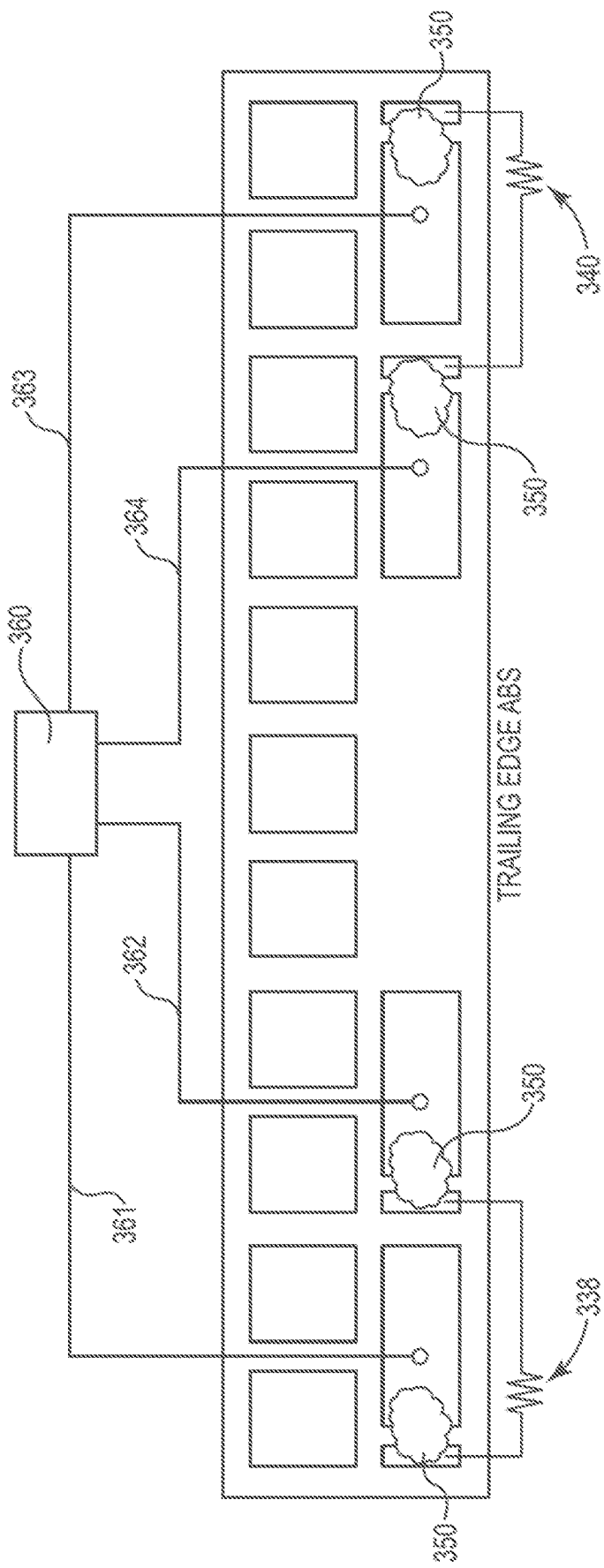
FIG. 8 is a view of the bonding pad layout of FIG. 7 with each of the small pad segments electrically connected to an adjacent larger ELG pad, such as by solder connections as shunts.

In FIG. 8, one manner of modifying the bond pad layout is illustrated to allow for conductor connection to an ELG pad 326 but to electrically connect the ELG pad 326 with a bond pad segment 336 so as to make the bond pad segment 336 fully functional. In particular, the bond pad segments 336 are too small to allow for easy electrically probing and/or conductor connection to the transducer devices 338 or 340. So, by providing an electrical connection between an ELG pad 326 and an associated bond pad segment 336, a probe or conductor can be attached to the ELG pad 326 by known techniques making the ELG pad 326 and its associated and electrically connected bond pad segment 336 functional for operation of the transducer devices 338 and 340.

One technique for providing an electrical connection between an ELG pad 326 and a bond pad segment 336 is shown in FIG. 8, wherein a shunt element comprising a solder bridge 350 can be deposited at the surface between and at least partially on the surfaces of the ELG pad 326 and bond pad segment 336. Solder deposition techniques are well known in the art and are conventionally utilized for permanent conductor and bond pad connections, such as those that can be utilized for conductor connection with the transducer device bond pads 124 and 224, discussed above. When the solder shunt or bridge 350 is provided to at least partially lie against and contact a surface of bond pad 326 and segment 336, connection of an electrical circuit to the bond pad 326 allows control of the transducer device that was and remains electrically connected with the bond segment 336.

After the lapping process is complete and the shunts or bridges 350 are provided, the ELG bond pads 326 of each pair are ready to be connected with a control system 360 by way of electrical conductors 361, 362, 363, and 364, which conductors can comprise appropriate wires or traces as are well known and may be run along a head suspension. FIG. 8 schematically illustrates the ELG bond pads as they would be connected to a control system 360 so that the transducer devices 338 and 340 can be controlled by the control system 360 as electrically connected.

Figure 9:
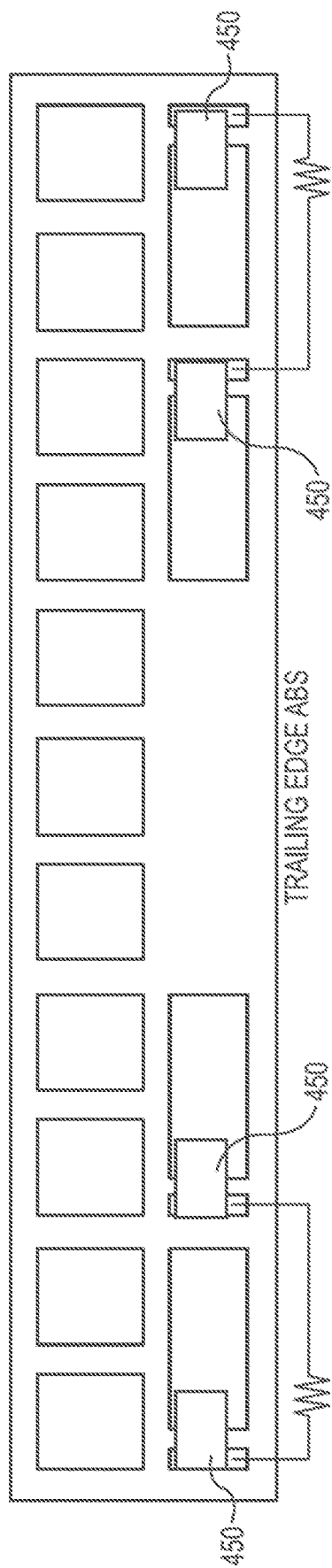
FIG. 9 is a view similar to FIG. 8, but with the small pad segments electrically connected with the ELG pads by metal bars as can be deposited by bar lithography or the like to electrically shunt the pads together.

FIG. 9 illustrates the creation of conductive bars as shunt elements 450 for connecting an ELG pad 426 with a bond pad segment 436, such as can be created by bar level lithography. Bar level lithography is a known deposition technique allowing for precise deposition of a metal material. Any controlled technique for precise metal deposition to create a metal bridge for at least partially lying against a surface of a bond pad and a segment are contemplated. The manner of electrically connection surface of an ELG pad with a surface of a bond pad segment does not matter so long as a sufficient electrical connection is created. In any case, by electrically connecting the ELG bond pad to a bond pad segment, the ELG pad is electrically connected with a transducer device, which electrical connection allows for electrical signals to and from a transducer device by way of the ELG pad. Electrical connection with a control system can be done after lapping and the provision of shunts or bridges 450, such as in accordance with the electrical schematic of FIG. 8.

Figure 10:
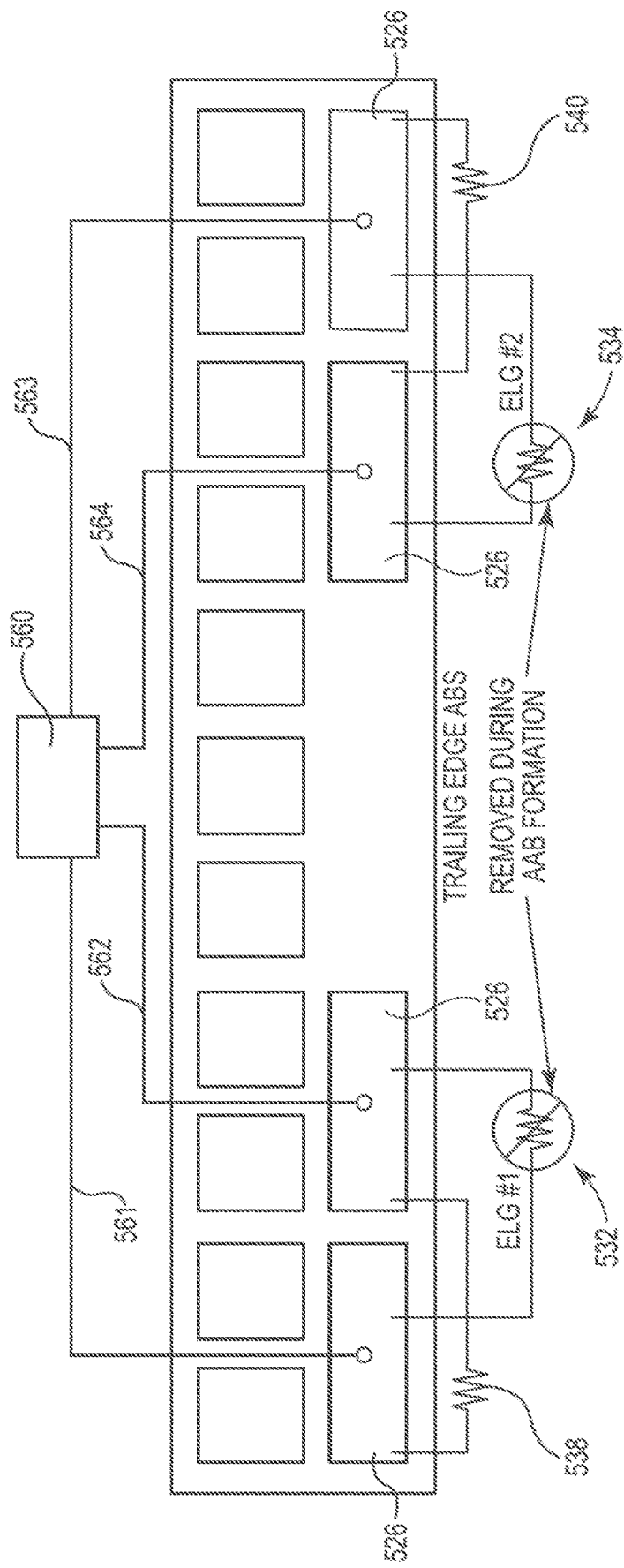
FIG. 10 illustrates another schematic illustration for utilizing an ELG bond pad after a lapping process is performed and the ELG bond pads are available for operational use with one or more transducer devices of a slider.

FIG. 10 illustrates yet another technique for utilizing an ELG bond pad after a lapping process is performed and the ELG bond pads are available for operational use with one or more transducer devices of a slider.

This example utilizes regular ELG bond pads 526 arranged as two pairs with one pair electrically connected with an ELG 532 and the other pair with an ELG 534. The first pair is also shown connected with a first transducer device 538 and the second pair is also shown connected with a second transducer device 540. This leaves a maximum area of ELG hook up during lapping. To utilize this arrangement, transducer devices 538 and 540 need to be electrically probed in series along with the ELG devices 532 and 534 prior to the lapping process and creation of the air bearing surface of the slider. During lapping, the effect of the transducer devices 538 and 540, each independently, must be determined so that lapping can be done while monitoring the ELGs and stopped at the right time based upon the monitored resistance value. Techniques for accommodating the effect of the presence of the transducer device on the same circuit as the ELG device can be found within commonly owned U.S. Pat. No. 7,119,995, the entire contents of which are fully incorporated herein by reference. By understanding how the transducer device 535 or 540 electrically affects the resistance reading from an ELG 532 or 534, resistance can be effectively monitored during lapping to stop at the desired time. After that, the transducer devices 538 and 540 will be independently controllable.

After the lapping process is complete, the ELG bond pads 526 of each pair are ready to be connected with a control system 560 by way of electrical conductors 561, 562, 563, and 564, which conductors can comprise appropriate wires or traces as are well known and may be run along a head suspension. FIG. 10 schematically illustrates the ELG bond pads as they would be connected to a control system 560 so that the transducer devices 538 and 540 can be controlled by the control system 560 as electrically connected.

Figure 11:
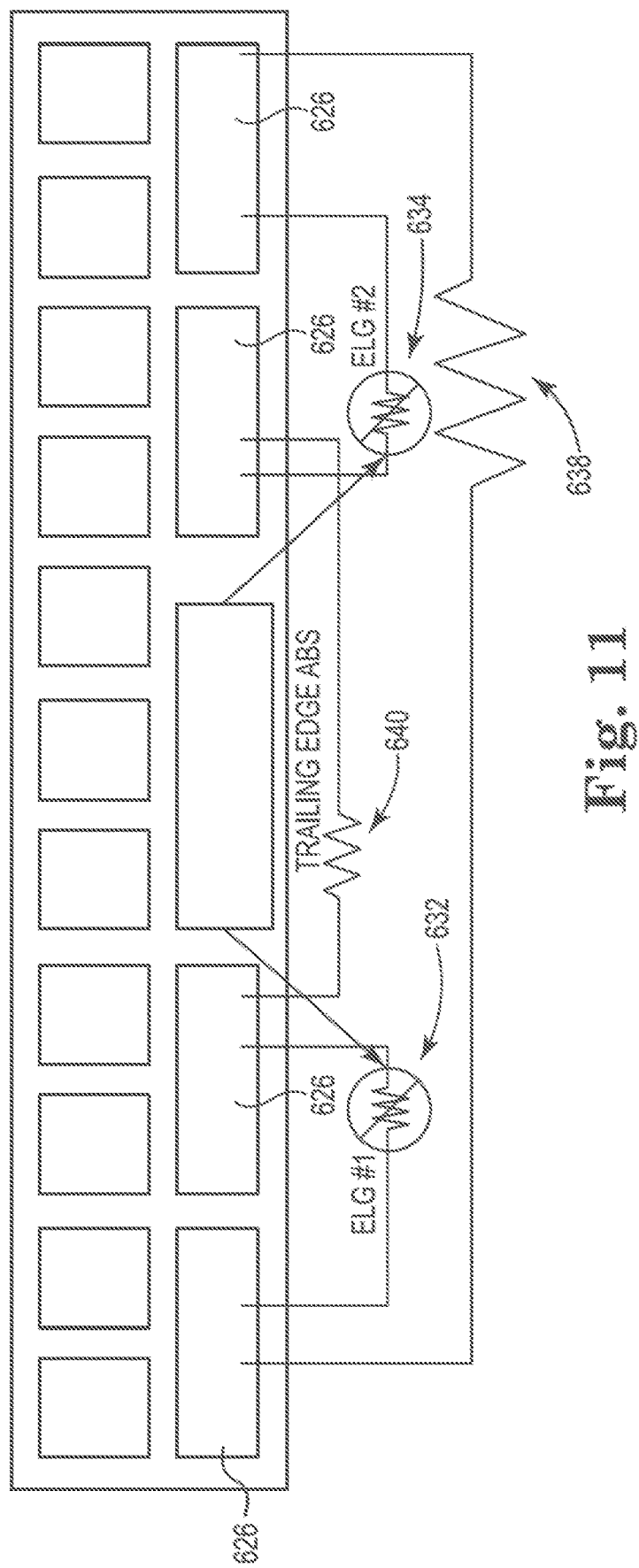
FIG. 11 is yet another schematic illustration of yet another technique for utilizing an ELG bond pad after a lapping process is performed and the ELG bond pads are available for operational use with one or more transducer devices of a slider.

FIG. 11 illustrates another example of an arrangement utilizing ELG bond pads 626 without segments, as above, that allows for utilizing ELG bond pads after a lapping process is performed and the ELG bond pads are available for operational use with one or more transducer devices of a slider.

In this example, a first ELG 632 is connected between a first pair of bond pads 626 and a second ELG 634 is connected between a second pair of bond pads 626, similar to that of FIG. 10. However, a first transducer device 638 is shown electrically connected with one bond pad 626 of the first pair and with one bond pad 626 of the second pair. Likewise a second transducer device 640 is connected with the other bond pad 626 of the first pair and the other bond pad 626 of the second pair. That is, transducer devices 638 and 640 are electrically connected to a single bond pad 626 from each ELG pair. This arrangement prevents any parallel shunting of the ELGs or the transducer devices. Independent probing of the ELGs and the transducer devices can be done. Like the embodiment of FIG. 10, once the lapping process is complete, the transducer devices 638 and 640 can be independently controlled utilizing an electrical connection with the ELG bond pads 626. Electrical connection with a control system can be done after lapping, such as in accordance with the electrical schematic of FIG. 10.

What is claimed is:

1. A method of processing a slider usable within a disk drive and having magnetic read and write transducers, comprising the steps of:

performing lapping operation an air bearing surface of at least one slider including magnetic read and write transducers with associated bonding pads along with at least one electrical lapping guide;

monitoring progress of the lapping operation by measuring electrical resistance of the electronic lapping guide by probing an electrical lapping guide bond pad;

ceasing the lapping operation at least partially based upon the measurement of a predetermined electrical resistance of the electrical lapping guide; and after the lapping operation is ceased, electrically connecting the electrical lapping guide bond pad to a transducer device bond pad of the slider by way of a shunt element, which electrical connection allows for electrical signals to and from a transducer device by way of the electrical lapping guide bond pad.

2. The method of claim 1, wherein the transducer bond pad is located adjacent to the electrical lapping guide bond pad, the electrical lapping guide bond pad being larger in size than the transducer bond pad creating a split bond pad combination at the trailing edge of the slider.

3. The method of claim 2, wherein plural pairs of transducer bond pads and electrical lapping guide bond pads are provided for creating plural split bond pad combinations at a trailing edge of the slider, and the method further comprises electrically connecting plural split bond pad combinations by electrically connecting each electrical lapping guide bond pad to its adjacent transducer bond pad by way of a shunt element.

4. The method of claim 3, wherein the transducer bond pad of one split bond pad combination and the transducer bond pad of another split bond pad combination are electrically connected with a first transducer device.

5. The method of claim 4, further comprising a step of electrically connecting the electrical lapping guide bond pad of at least one split bond pad combination to a transducer device control conductor so that the first transducer device is electrically connected with a control system by way of the transducer bond pad, the shunt element, and the electrical lapping guide bond pad.

6. The method of claim 1, wherein the shunt element is created by a deposition process.

7. The method of claim 6, wherein the deposition process comprises a solder jetting process.

8. The method of claim 6, wherein the deposition process comprises a bar level lithography process.

* * * * *